United States Patent [19]

Johnson et al.

[11] Patent Number: 4,636,425
[45] Date of Patent: Jan. 13, 1987

[54] URETHANE BONDING METHOD AND LAMINATE

[75] Inventors: Malcolm C. Johnson, Lapeer; Theodore O. Stolz, Pontiac, both of Mich.

[73] Assignee: Foamseal, Inc., Oxford, Mich.

[21] Appl. No.: 742,821

[22] Filed: Jun. 10, 1985

[51] Int. Cl.$^4$ ............................ B32B 7/14; B32B 3/12
[52] U.S. Cl. ...................................... 428/198; 156/78; 156/291; 156/295; 427/208.2; 427/208.6; 427/421; 428/317.5
[58] Field of Search .................. 428/198, 317.1, 317.5, 428/317.7; 427/421, 426, 256, 208.6, 208.2; 156/78, 291, 295

[56] References Cited

U.S. PATENT DOCUMENTS

| 4,004,049 | 1/1977 | Horwat et al. | 427/208.6 |
| 4,036,673 | 7/1977 | Murphy et al. | 156/295 |
| 4,044,184 | 8/1977 | Ashida et al. | 428/318.8 |

FOREIGN PATENT DOCUMENTS 224265 7/1959 Australia ........................ 428/317.5

Primary Examiner—William J. Van Balen
Attorney, Agent, or Firm—Cullen, Sloman, Cantor, Grauer, Scott & Rutherford

[57] ABSTRACT

A method of surface bonding elements with a two component polyurethane foam, particularly where one of the surfaces to be joined is relatively porous, including contoured fiberglass panels, carpet, foam and fibrous paneling and the resultant bonded structure. The method includes spraying the liquid foamable polyurethane in a fine mist under pressure on one of the surfaces to be bonded to form dispersed discrete liquid polyurethane droplets; permitting the polyurethane droplets to foam and expand in discrete foam pods; applying the second surface to be joined while said polyurethane foam pods are between 20% and 60% of full cure; and, completing the cure of the polyurethane foam, preferably under moderate heat and pressure.

13 Claims, 5 Drawing Figures

U.S. Patent    Jan. 13, 1987    4,636,425
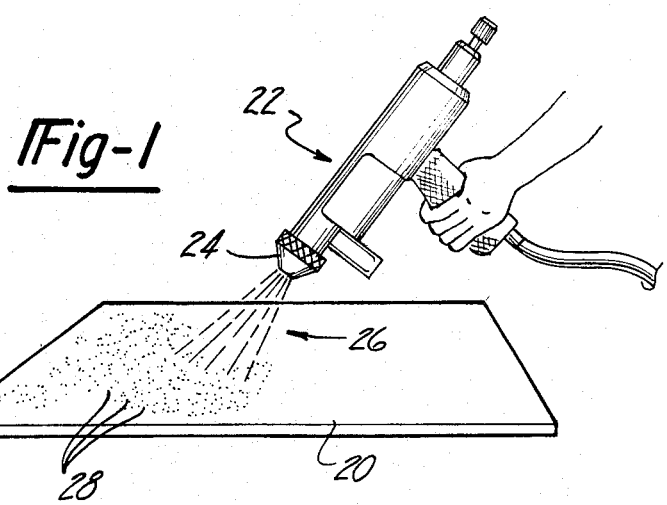
Fig-1
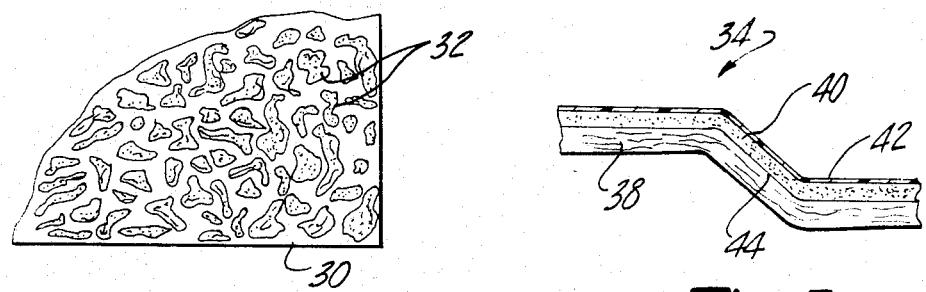
Fig-2
Fig-3
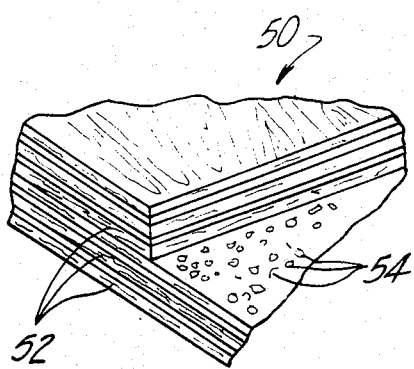
Fig-5
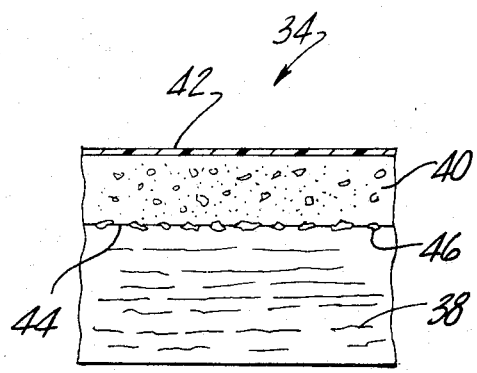
Fig-4

URETHANE BONDING METHOD AND LAMINATE

FIELD OF THE INVENTION

A method of bonding, particularly of porous or fibrous materials, utilizing polyurethane foam as the bonding medium and the resultant laminated structures.

DESCRIPTION OF THE PRIOR ART

Industrial applications often require bonding to relatively porous or fibrous materials. For example, molded fiberglass shells are used as a substrate for automotive headliners, however, the fiberglass shell must be covered. In the preferred application, the shell is covered with a reticulated polyester foam backed vinyl fabric. Contact cement is used to glue the foam cover sheet to the contoured fiberglass panel, however, because of the small surface contact areas available for bonding in this application, the adhesion is often lost, resulting in a very substantial percentage of scrap. This adhesion problem is compounded where the molded contoured fiberglass panel includes deep draws, placing the foam backed vinyl sheet under tension. Contact cement works best when the surfaces to be bonded are clean, smooth and relatively dense.

Another difficult application is bonding carpet to various substrates, including foam pads or backing. Carpet generally includes a flexible nonresilient scrim backing to which the carpet loops are knotted, resulting in a relatively porous structure. Carpet pads include various polymer foams and pressed foam scraps. A liquid polyurethane foam may be applied directly to the carpet scrim backing, however, this is a relatively expensive application which is not widely used. The need therefore remains for a bonding method which may be used in commercial applications to bond relatively porous materials, including contoured substrates. As used herein, "porous" refers to any surface having a relatively small contact area available for bonding, including, for example, fibrous materials such as fiberglass panels, carpet, foam, woven and unwoven fabrics, etc.

Another potential application for the urethane bonding method of this invention is gluing structural plywood because of the very substantial energy savings available. At present, the veneer outer plywood layers must be dried in large commercial dryers from a moisture content of 60 to 120% for green veneer to no greater than 7% for softwoods and 8% for hardwoods. The veneer is rotary lathe peeled from the log, which requires soaking the log to prevent splitting of the veneer. The formaldehyde resins used to bond the plies will not properly cure at greater moisture contents. Softwoods are glued with phenol-formaldehyde resin adhesives and hardwoods are glued with urea-formaldehyde resin adhesives. The formaldehyde adhesives are applied to the softwood plies by spray and curtain coater applicators and to hardwood plies by roll coater applicators. The plies are then stacked in a large press having plates heated to about 300° F. for phenol-formaldehyde resin bonded softwoods and 250° F. for urea-formaldehyde bonded hardwoods. The presses are closed under pressure of 150 to 200 pounds per square inch, requiring 20 to 40 minutes to complete the curing of the formaldehyde adhesives, resulting in very substantial energy consumption.

Formulating an adhesive to attain acceptable bond qualities for plywood is as much an art as a science because each wood ply represents a different combination of available capillaries and surfaces of available wettability. The nature of the adhesive to wood bonds has been variously described as physical, chemical and secondary chemical bonding. It is apparent, however, that the present formaldehyde bonding adhesives and method of gluing structural plywood are not energy efficient because of the severe drying requirements, resulting from the use of formaldehyde adhesives, and the substantial energy used in the hot presses required to bond the plies. The urethane bonding method of this invention, which does not use a water soluble adhesive and which does not require the substantial pressures and temperatures required by the formaldehyde adhesives, will result in a substantial energy savings.

SUMMARY OF THE INVENTION

As described, the urethane bonding method of this invention is particularly suitable for adhering two substrates together, one or both of which may be relatively porous. The method may be performed rapidly with a minimum amount of process heat and pressure, resulting in a unique laminate. The method of this invention includes spraying a fine mist of a two component foamable liquid polyurethane on one of the substrate surfaces under pressure forming dispersed discrete liquid droplets of liquid foamable polyurethane on the surface. The polyurethane droplets are then allowed to rise and at least partially gel, preferably in discrete foam pods. The urethane only partially reacts, slowly, because the separation of the droplets and the consequent loss of the heat of reaction, becoming tacky and viscous. The second substrate is then brought into contact with the urethane coated substrate, while the urethane remains between 20 and 60% of full cure, preferably about 30 to 50% of full cure. Then, usually with the addition of heat and slight pressure, the urethene foam reaction is allowed to go to completion, resulting in a very strong permanent bond.

The foamable liquid urethane is preferably sprayed on the first substrate under a pressure of between about 1500 and 2000 pounds per square inch. The size and shape of the nozzle opening will depend upon the application, as described herein, however a high pressure nozzle is used to spray a relatively fine mist, such that the liquid urethane is dispersed on the substrate in discrete droplets. When the urethane expands and sets up, the foam preferably remains in discrete pods separated by a skin, such that the foam does not expand substantially perpendicular to the plane of the substrate, separating the layers of the laminate. This substantially reduces the pressure required to form the laminate and the curing time. Another important feature of the method of this invention is the timing of the application of the second substrate. If the second substrate is applied immediately after application of the liquid polyurethane, the foam will blow through both lamina. If the foam is substantially completely cured and set up, the second lamina will not adhere to the first lamina. In a typical application, the viscosity of the foam actually decreases at about 20% of full cure, as the system exothermically reacts and polymerization begins. The viscosity then increases exponentially. There is, therefore, a relatively small window when the second substrate should be applied to the first substrate.

As described, the method of this invention is particularly suitable for adhering a flexible element to a contoured substrate which may include deep contoured draws. Where a flexible sheet, such as a reticulated polyester foam backed vinyl fabric is attached to a self supporting substrate, such as a die formed fiberglass panel, the polyurethane foam is preferably applied to the self supporting element because of the ease of application. The method then includes forming a substrate into a contoured shape in a die press. The two component foamable liquid polyurethane is then sprayed on the contoured substrate in a fine mist forming dispersed discrete liquid droplets of polyurethane, as described above. The polyurethane droplets are then permitted to foam and expand in discrete foam pods and the flexible finish sheet is applied over the substrate, preferably while the foam pods are between 30 and 50% of full cure. Where the substrate is formed in a die press, the press may be closed under light to moderate pressure to complete the curing of the polyurethane.

The method of gluing structural plywood is substantially as described above. The method includes spraying a fine mist of the two component liquid foamable polyurethane under pressure on one surface of the fibrous panels to be joined in the plywood, wherein the spray forms generally dispersed discrete droplets of foamable liquid polyurethane on one surfce of the panels to be joined. The polyurethane is then allowed to rise and gel to less than 60% of full cure. The panels are then stacked in face-to-face contact and the curing of the polyurethane foam is completed in seconds, rather than minutes, under moderate pressure sufficient to assure that the panels are flat.

It is believed that the resultant laminates are also unique because the polyurethane pods which form the bonding medium preferably react and skin prior to contacting the adjacent pods. Thus, the laminate includes the contacting or substantially contacting substrates and a plurality of discrete polyurethane foam pods each having end portions permanently joined to the opposed substrates and a mid portion which is at least partially discrete and skinned.

Other advantages and meritorious features of the present invention will be more fully understood from the following description of the preferred embodiments, the appended claims, and the drawings, a brief description of which follows.

BRIEF DESCRIPTION OF THE DRAWINGS

FIG. 1 is an elevated side view of one method of applying the polyurethane foam bonding medium;

FIG. 2 is a top view of a panel after application of the polyurethane foam bonding medium;

FIG. 3 is a side cross-sectional view of a contoured laminate bonded by the method of this invention;

FIG. 4 is an enlarged side cross-sectional view of FIG. 3; and

FIG. 5 is a side elevation of a fiber board or plywood laminate formed by the method of this invention.

DESCRIPTION OF THE PREFERRED EMBODIMENTS AND METHOD OF THIS INVENTION

As described above, the method of bonding of this invention is particularly suitable for porous and fibrous materials. The prior methods of bonding these materials generally include the application of a contact cement or adhesive which may result in delamination, particularly where one or both of the surfaces to be bonded are relatively porous. For example, an automotive headliner may include a polyester foam covering which is difficult to bond to the substrate, particularly where the substrate has a contoured surface.

The method of this invention includes spraying a foamable liquid polyurethane onto one of the surfaces to be bonded using a relatively high pressure spray apparatus and forming discrete droplets of liquid urethane on the surface sprayed. As shown in FIG. 1, a conventional high pressure urethane foam spray apparatus 22 may be utilized to spray the surface of the panel 20. The spray gun 22 may be a conventional high pressure spray gun as presently utilized to spray two component liquid foamable polymers, such as polyurethane. A suitable spray gun is manufactured by Gusmer Corporation, model "AR". As will be understood, urethanes are polymers which are generally formed by reacting two monomers, one of which is an isocyanate, such as toluene diisocyanate or polymeric isocyanate and the other monomer having molecules containing active hydroxyl groups or molecules reactive with isocyanates, including themselves. The technology is well developed whereby the two reactive components described are blended with appropriate catalysts, blowing agents, surfactants and flame inhibitors. The components are simultaneously pumped in two separate streams at high pressure to the spray gun, where the components are mixed and sprayed through the high pressure nozzle 24. A blowing agent is used to alter the density of the resultant polymer, ranging from about 70 lbs. per cubic foot with no blowing agent to as low as 0.4 lbs. per cubic foot, with a blowing agent. Water, which reacts with isocyanate to form carbon dioxide gas, or chlorofluorocarbon gases are normally used as the blowing agents. With the addition of the blowing agent, the reacting polymer may expand to more than 50 times its liquid volume after being sprayed. As the polymer is reacting, it goes from a mixed liquid to a viscous and very tacky substance and finally to a dry, fully cured polymer. The final polymer may be hard or flexible, depending upon the starting materials.

The process of this invention utilizes a two component foamable liquid polyurethane as the bonding medium which is applied in a finely dispersed mist of droplets 26. In a typical application, a foamable liquid polyurethane, which is preferably catalyzed, is sprayed on one of the surfaces to be bonded with a relatively high pressure nozzle 24. For example, in a manual application as shown in FIG. 1, a cone-shaped nozzle opening may be preferred. A cone-shaped nozzle opening sprays a greater density at the axis of the cone, permitting overlap to assure complete coverage. Where the nozzle is directed mechanically, a fan-shaped nozzle opening may be preferred, wherein the density of the spray is substantially uniform. In the examples described hereinbelow, a 1500 psi hydraulic pressure cone-shaped nozzle available from Gusmer Corporation was utilized. In actual testing, it was found that a hydraulic pressure of less than 1000 psi was insufficient to form the finely dispersed mist of droplets preferred. Further testing established that a nozzle pressure of between about 1500 psi and 2000 psi was preferred. This pressure in a nozzle of the type disclosed created a finely dispersed mist 26 and disbursed droplets 28 on the surface sprayed, as shown in FIG. 1.

FIG. 2 illustrates a panel 30 having dispersed discrete droplets 32 of polyurethane foam 32 which have been sprayed on the surface of the panel 30 by the method described above in regard to FIG. 1 and permitted to foam and expand. As described, the liquid foamable polyurethane is sprayed on at least one surface to be bonded in a relatively fine mist, such that the liquid urethane is dispersed on the surface in discrete droplets 32. When the urethane expands and sets up, the foam preferably remains in discrete pods separated by a skin, such that the foam does not expand primarily perpendicular to the plane of the surface, separating the layers of the final laminate. This method substantially reduces the pressure required to form the laminate and reduces the curing time. The droplets 32 shown in FIG. 2 have substantially completely expanded, but remain in discrete droplets. As will be understood, a small percentage of the droplets may contact, but remain separated by the skin formed on the droplets as they cure. Preferably, however, the droplets remain spaced and discrete, allowing for lateral expansion when the laminate is formed.

The laminate shown in FIGS. 3 and 4 illustrates some of the advantages of the method of this invention. The disclosed laminate includes a fiberglass panel 38, a reticulated polyester foam layer 40 and a vinyl finish layer 42. The polyester foam layer 40 must be bonded to the fiberglass panel 38. This laminate is used for automotive headliners wherein the fiberglass panel 38 is received against the automotive roof panel and the vinyl surface layer 42 provides the finish surface within the automotive compartment. The foam layer 40 provides the preferred "soft hand" texture for the headliner and the fiberglass layer assists in sound attenuation. In this application, the fiberglass panel 38 is formed in a conventional die press into a contoured shape conforming to the interior surface of the automotive roof and the panel must include relatively deep draws for this application. It has been found very difficult, however, to bond the relatively porous foam layer 40 to the contoured surface of the fiberglass panel 38. Attempts have been made to bond these surfaces using contact cement, which has resulted in substantial scrap because the panels delaminate. The method of this invention solves this problem in a very simple and relatively inexpensive process.

A two component polyurethane is preferably sprayed on the contoured surface 44 of the fiberglass panel 38 because the fiberglass panel is self-supporting. As will be understood, however, the polyurethane foam may be applied to either surface. As described, the liquid foamable polyurethane is sprayed on the surface 44 in a finely dispersed mist, forming discrete droplets 46 on the surface 44 of the fiberglass panel. Because the surfaces of the fiberglass panel 38 and the reticulated polyester foam are relatively porous, the dispersed droplets 46 may expand laterally and into the porous surfaces, as shown in FIG. 4. Several polyurethane systems may be used in the method of this invention, including relatively low functionality (2.2) flexible polyurethane foams and medium functionality (3.5) relatively rigid foams. The most preferred polyurethane system for bonding very porous surfaces, such as the laminate shown in FIGS. 3 and 4, is a relatively unreactive rigid medium functionality polyurethane foam having less than five functionality, and preferably about 3.5 functionality. The "A" component of the polyurethane foam is preferably a polymeric MDI (methylene diphenyl diisocyonate) which is less toxic than TDI (toluene diisocyanate) systems. The more flexible, lower functionality polyurethane foams may also be used, as described herein, particularly in applications which are subject to shear.

An important feature of the method of this invention is the sequence and timing of the application of the second lamina to the first lamina which has received the urethane bonding medium. If the second lamina is applied immediately, the foam will blow through both lamina where the lamina are very porous, as shown in FIGS. 3 and 4. Alternatively, if the lamina are less porous, the expanding urethane will separate the lamina. If the foam is substantially fully cured and set-up, the second lamina will not adhere to the first lamina. In a typical application, the viscosity of polyurethane foam actually decreases at about 20% of full cure, as the system exothermically reacts and polymerization begins. The viscosity then increases exponentially. There is, therefore, a "window" when the second layer or lamina should be applied to the first lamina. Relatively unreactive foams are therefore preferred to provide sufficient working time to form the laminate. In the most preferred method of this invention, the second lamina is applied to the first lamina at about 30 to 50% of full cure, however, it is possible to apply the second lamina to the first lamina in the range of about 20 to 60% of full cure. A relatively light pressure may then be applied to maintain the preferred dimensions of the laminate and the laminate may be heated in some applications. As described above, the bonding system of this invention is therefore energy efficient, particularly when compared to other systems which require relatively high pressure and greater heat. The pressure may be applied by conventional means, including a die, rollers and clamps. In a die application, the pressure may be sufficient to just close the die.

In the application shown in FIGS. 3 and 4, where a reticulated polyester foam 40 is bonded to a contoured fiberglass panel 38, a medium functionality slow rise rigid polyurethane foam having a density of about 2 lbs. per cubic foot may be utilized. The following is a suitable formulation for the "B" or polyol component of the urethane, wherein the percentages of the constituents is given in weight percent:

| Wt. % | Constituent |
| --- | --- |
| 46 | Multranol 4034 |
| 12 | Multranol 4050 |
| 10 | Terate 203 |
| 31 | Freon 11 |
| 1 | L 5420 |
| .03 | Ul-24 |
| 0.5 | DMEA |

The "Mutranol" 4034 and 4050 are polyols available from Mobay Chemical Corp. and "Terate" 203 is a polyol available from Hercules Incorporated. "Freon 11" is a blowing agent available from E. I. DuPont, "L 5420" is a surfactant available from Union Carbide Corporation and "UL-24" is an organic tin catalyst available from Witco Corporation. The described polyol blend in the resin has a functionality of about 4.0. The described "B" resin constituent was then mixed with a polymeric MDI in a 1:1 ratio by volume and the liquid foamable urethane was sprayed at a temperature of about 85° F. under 1500 to 2000 psi hydraulic pressure. The preferred spray nozzle is a cone-shaped nozzle having an orifice diameter of 0.070 inches. As described, this nozzle sprays the urethane in a finely dispersed mist of droplets, wherein the droplets cover substantially less than 50% of the total surface area. The fiberglass panel 38 was previously formed in a die press having opposed die plattens, which formed a deep drawn dish-shaped panel utilized as an automotive headliner. The reticulated polyester foam 40 includes a polyester skin layer 42, wherein the foam surface was applied to the fiberglass panel, after forming. The foam layer 40 may be applied to the fiberglass panel after approximately 20 seconds or about 30% of full cure of the polyurethane foam droplets 46. Where the fiberglass panel 38 is formed in a die, the foam layer 40 may be applied over the contoured fiberglass panel 38 in the die, wherein the die member is then closed, forming the finished laminate as shown in FIGS. 3 and 4.

FIG. 5 illustrates a plywood panel 50 wherein the lamina 52 are joined by the method of this invention. In the preferred method of forming a plywood panel, one surface of each lamina is sprayed with a finely dispersed mist of a two component liquid foamable urethane which preferably forms a relatively flexible foam because of the shear stresses applied to structural plywood. As described, the liquid droplets 54 are dispersed over the surface of the lamina, using a high pressure spray gun assembly. The spray gun is preferably mechanically operated using a fan-shaped nozzle providing a substantially uniform spray pattern of discrete droplets 54. A suitable formulation for the two component polyurethane system is as follows. The "B" or polyol component of the urethane may comprise the following, in weight percent:

| Wt. % | Component |
|-------|-----------|
| 69.4 | R650X |
| 29.4 | Freon 11 |
| 0.6 | LK221 |
| 0.3 | DMEA |
| 0.3 | Catalyst |

"R650X" is a polyol available from Texaco Corporation. "Freon 11" is a blowing agent available from E. I. DuPont. "LK221" is a surfactant available from Air Products. DMEA is dimethyl ethanolamine and the catalyst used was 24% lead octoate. The "B" component was mixed in the spray gun in a 1:1 ratio by volume with a polymeric isocyanate, such as "Mondur MR", available from Mobay Chemical Corp. The above described formulation for the two component liquid polyurethane will set up completely within about two minutes. As described, however, the lamina should preferably be bonded within 30 seconds to one minute after application of the foam. The polyol blend of the "B" component has a functionality of about 3.7, which is mixed in the nozzle with the polymeric MDI having a functionality of about 2.7. The liquid urethane foam was sprayed under a pressure of about 2000 psi at a temperature of about 85° F. The pressure necessary to maintain the dimensional relation of the lamina is about 50 to 100 psi, which is sufficient to flatten the lamina, which is maintained for about one minute. This should be compared to the present method of forming plywood panels which requires a temperature of 250° F. and a pressure of 250 psi for 5 to 6 minutes, as described above.

The method of this invention may also be utilized to form a laminate of relatively porous fiber board, wherein the preferred urethane composition may be similar to the composition described above in forming plywood panels. Further, the method of this invention may be utilized to bond a foam backing material to a carpet, wherein the urethane formulation may be similar to the formulation described above in regard to the laminate shown in FIGS. 3 and 4.

The method of this invention therefore includes spraying a fine mist 26 of a two component foamable liquid polyurethane on one surface of the elements to be joined, forming discrete dispersed droplets of liquid foamable polyurethane, such as shown at 28 in FIG. 1, 32 in FIG. 2, 46 in FIG. 4 and 54 in FIG. 5. The polyurethane droplets are then permitted to foam and expand in discrete foam pods to between 20 and 60% of full cure. Finally, the surface of the second element may be applied to the sprayed surface and the polyurethane foam droplets are then permitted to completely cure, permanently bonding the surfaces together. As described, the components of the laminate may be formed in a die press, wherein one of the elements includes a contoured surface and the liquid foamable polyurethane is sprayed onto the contoured surface, as shown in FIG. 3, forming dispersed discrete liquid droplets of polyurethane 46, as shown in FIG. 4. The laminate formed by the method of this invention is also unique because the polyurethane foam bond comprises a plurality of discrete polyurethane foam pods, 46 in FIG. 4 and 54 in FIG. 5, each having end portions permanently joined to the opposed surfaces and the foam pods include a mid portion at least partially discrete and skinned.

We claim:
1. A method of bonding two elements in surface-to-surface contact, wherein at least one of the element surfaces is relatively porous, comprising the following steps:
   (a) spraying under pressure a fine mist of a two component foamable liquid polyurethane on one of said element surfaces forming discrete dispersed generally spaced small droplets of liquid foamable polyurethane on said one element surface;
   (b) allowing said polyurethane droplets to foam and expand in discrete foam pods to between 20 and 60% of full cure, the spacing between said droplets being sufficient to permit said pods to expand and skin prior to fully contacting adjacent pods, forming said discrete urethane foam pods; and
   (c) applying a second element surface and completing the cure of said polyurethane pods.

2. The method of bonding defined in claim 1, wherein said foamable liquid polyurethane is sprayed on said one element surface under a pressure of greater than 1000 lbs. per square inch.

3. The method of bonding defined in claim 1, wherein said elements are heated to complete the curing of said polyurethane foam pods.

4. A method of bonding a flexible sheet to a die formed element, comprising the following steps:
   (a) forming said element into a permanently contoured shape in a die press;
   (b) spraying the contoured surface of said element which is to receive said flexible sheet with a fine mist of a two component foamable liquid polyurethane under pressure, forming dispersed discrete spaced liquid droplets of polyurethane on said contoured surface;
   (c) allowing said polyurethane droplets to foam and expand in discrete individually skinned pods to less that 60% of full cure; and
   (d) applying said flexile sheet on said contoured element surface, while said polyurethane droplets are between 20 and 60% of full cure, and then completing the cure of said polyurethane.

5. The method of bonding defined in claim 4, wherein said foamable liquid polyurethane is sprayed on said contoured element surface under a pressure greater than one thousand pounds per square inch, forming discrete liquid polyurethane droplets on said surface generally spaced a distance sufficient to permit said droplets to expand and skin prior to contact with the adjacent droplets, thereby forming discrete polyurethane foam pods on said surface.

6. The method of bonding defined in claim 4, wherein said element is a fiberglass mat, including forming said mat in a heated contoured die under pressure, forming a permanently contoured fiberglass panel; spraying one surface of said fiberglass panel, as defined, with a fine mist of liquid foamable polyurethane; allowing said polyurethane droplets to foam and expand to less than fifty (50%) percent of full cure; and applying said flexible sheet on said contoured surface while said polyurethane droplets are between thirty and fifty percent of full cure, and completing the cure of said polyurethane foam in said heated die, under moderate pressure.

7. A method of bonding a laminate of fibrous panels, comprising the following steps:
(a) Spraying a fine mist of a two component liquid foamable polyurethane under pressure of at least 1000 pounds per square inch on one surface of the fibrous panels to be joined, said pray forming generally dispersed discrete generally spaced droplets of foamable liquid polyurethane on said one surface of said panels;
(b) allowing said liquid polyurethane to foam and expand in discrete foam pods to less that 60% of full cure of said polyurethane the spacing between said droplets being sufficient to permit said pods to expand and skin prior to fully contacting adjacent pods, forming said discrete urethane foam pods;
(c) locating said panels in face-to-face contact and applying heat and pressure, thereby completing the cure of said polyurethane foam pods and forming a permanently bonded laminate.

8. The method of bonding a laminate, as defined in claim 7, wherein said foamable liquid polyurethane is sprayed on said one surface of said panels under a pressure of between about 1500 and 2000 pounds per square inch.

9. The method of bonding a laminate defined in claim 7, wherein said discrete liquid polyurethane droplets are generally spaced on said one surface of said panels a distance generally sufficient to permit said foam pods to expand and skin prior to contacting the adjacent pods.

10. A laminate comprising a first element having a contoured surface and a flexible sheet permanently bonded to said contoured surface in face-to-face relation by a two component polyurethane foam bond, said bond comprising a plurality of discrete polyurethane foam pods each having end portions permanently joined to the opposed surfaces of said element and said sheet and said foam pods having a midportion at least partially discrete and skinned.

11. The laminate defined in claim 10, wherein said first element is a formed contoured fiberglass panel and said polyurethane foam pods are integrally joined to said contoured surface and penetrating said surface into said fibers.

12. The laminate defined in claim 11, characterized in that said flexible sheet is reticulated foam.

13. A plywood laminate, including a plurality of fibrous wood panels permanently bonded in face-to-face relation by the two component polyurethane bond, said bond comprising a plurality of discrete polyurethane foam pods each having end portions permanently joined to the opposed panel surfaces and a mid portion at least partially discrete and skinned.

* * * * *